Figure 1:
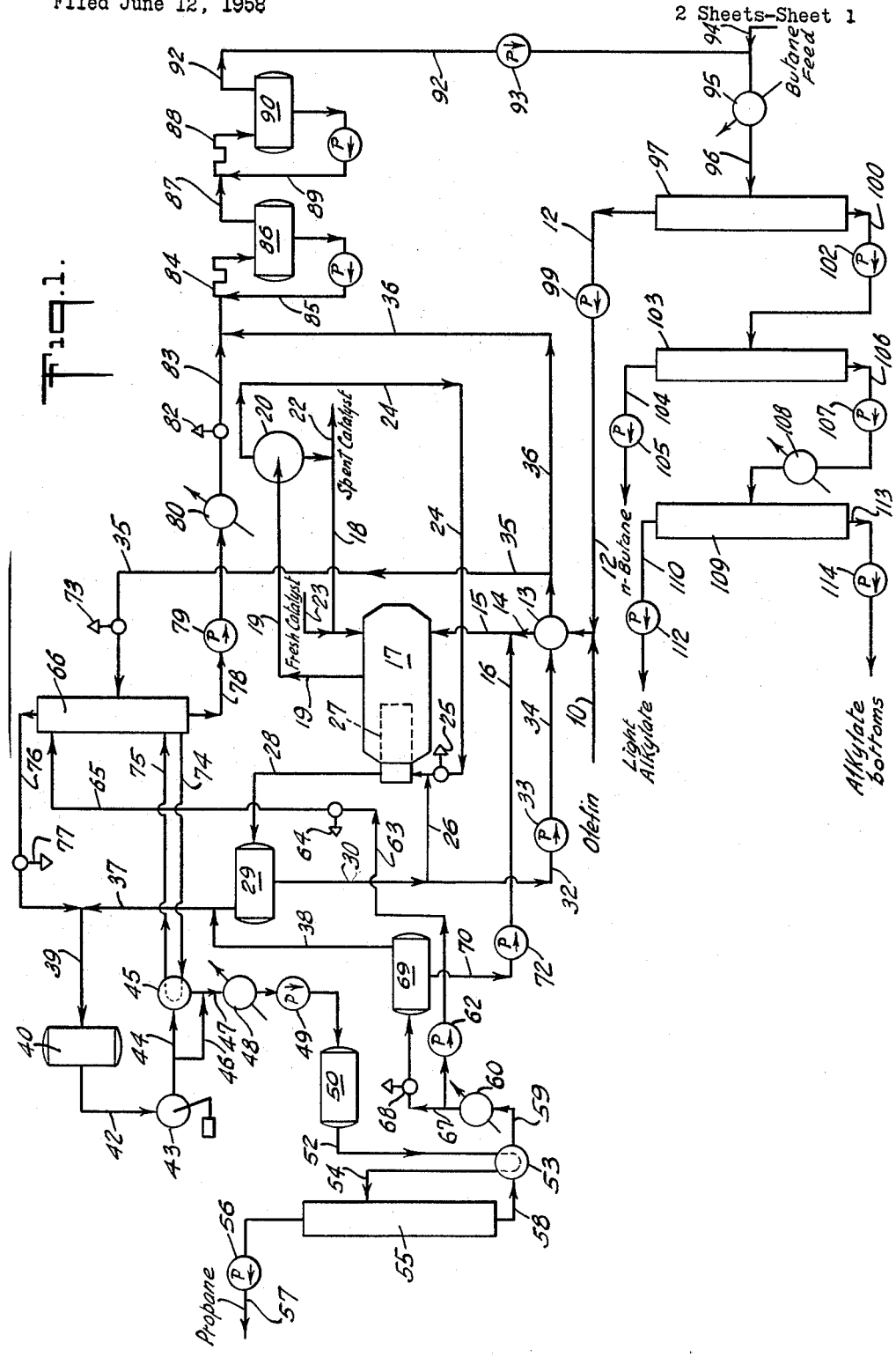

Dec. 22, 1964     D. K. BEAVON     3,162,694
ALKYLATION PROCESS WITH ASSISTED DEISOBUTANIZING
Filed June 12, 1958     2 Sheets-Sheet 1

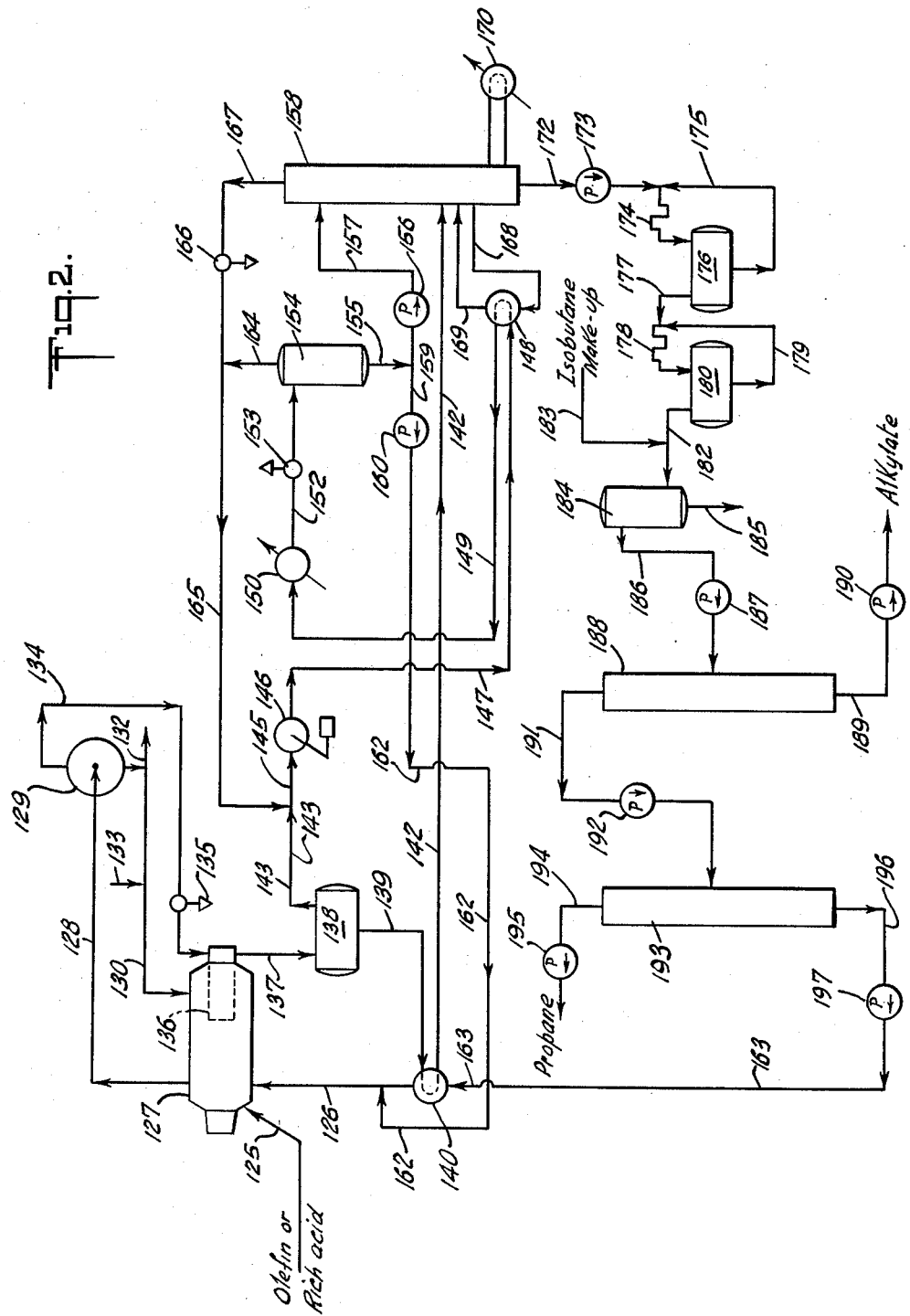

3,162,694
ALKYLATION PROCESS WITH ASSISTED
DEISOBUTANIZING
David K. Beavon, Darien, Conn., assignor to Texaco Inc., a corporation of Delaware
Filed June 12, 1958, Ser. No. 741,663
13 Claims. (Cl. 260—683.62)

This invention relates to an improved process for catalytic alkylation, and more specifically to such process wherein an olefin-based alkylatable material is alkylated with isobutane in an alkylation zone refrigerated by the evaporation of low boiling hydrocarbons including isobutane.

In an alkylation of this type a preponderance of isobutane (generally as much as 70 to 80 mol percent or even more of all the hydrocarbons in the reaction mixture) over alkylatable material and hydrocarbon diluents is used to direct the reaction towards production of the most valuable aviation or automotive fuels. Consequently, a great deal of isobutane must be recovered and recycled for reuse if the process is to be practical.

The alkylatable material for reacting with isobutane is olefin-based, i.e. it is generally an olefinic hydrocarbon itself such as propylene, butylene, amylene or the like, but it also can be an alkyl sulfate or fluoride (as obtained for example in a so-called "two-stage" process wherein an olefinic hydrocarbon is absorbed in sulfuric acid or HF as a first stage in the alkylation operation), or an alkyl halide, suitably an alkyl fluoride or chloride which can be made readily from olefinic hydrocarbons by other means.

The contacting of the excess isobutane with the alkylatable material and catalyst is done in liquid phase; the desirable low temperature, e.g. ordinarily below about 75° F. and advantageously 30° to 55° F., can be maintained in the alkylation zone either by autorefrigeration of that zone or by effluent refrigeration applied to that zone.

In an effluent refrigeration system the output of the alkylation zone is separated into a hydrocarbon phase and a liquid catalyst phase, the separated hydrocarbon phase is passed into a flash zone of lower pressure where any low boilers, including some of the isobutane present, are vaporized with concomitant cooling of the remaining liquid hydrocarbons including alkylate, and at least a part of the remaining liquid hydrocarbons are used to refrigerate the reaction zone indirectly. In such operation the alkylation zone and effluent separator are maintained under sufficient pressure to keep all components in the liquid phase. Flashing in a flash zone as referred to herein denotes the practically adiabatic forming of chilled vapors and residual liquid by reduction of pressure on a liquid hydrocarbon material. In an autorefrigeration system the lower boiling hydrocarbons, including some of the isobutane present, are evaporated directly from the contents of the alkylation reaction zone to cool it.

Other alkylation conditions include use of a mol ratio of isobutane to olefin supplied to the alkylation zone (including isobutane recycle) substantially in excess of 1:1, and generally between about 4:1 and about 10:1; use of a liquid catalyst:liquid hydrocarbon volume ratio between about 0.5:1 and 5:1 and preferably about 1:1; and use of alkylation strength catalyst, e.g. sulfuric acid of at least about 88% strength, HF of at least about 85% titratable acidity, or an aluminum chloride-hydrocarbon complex liquid catalyst, e.g. one having an active aluminum chloride content (expressed as equivalent aluminum) of at least about 15 weight percent. Advantageously the catalyst will be a liquid which is non-volatile under the alkylation reaction conditions, and preferably it will be sulfuric acid maintained at about 88 to 92% strength by the addition of make-up 98–99.5% sulfuric acid in amount sufficient to maintain this strength while purging spent acid from the system.

Utilities consumption in such alkylation process is very large; the process is one of the most expensive for unit output in a refining operation. There are two significant reasons for this. One is the heavy deisobutanizing load for recovery of unreacted isobutane from the reacted mixture. The other is the necessary compression and condensation of refrigerant vapors. In the latter operation the heat abstracted by the evaporated low boiling hydrocarbons is practically irretrievably dissipated into cooling water in the conventional plant.

The separation of isobutane from normal butane and heavier materials can be done in a number of ways, most commonly by fractional distillation wherein the molal reflux ratio is generally approaching 10:1 or even higher to obtain greater than 90% concentration of isobutane in the overhead distillate. This, of course, involves a great deal of reboiling and condensing, but is, nevertheless, vital for maintaining the desired high preponderance of isobutane over all other hydrocarbons in the alkylation reaction mixture because recovered isobutane usually makes up a large part of the isobutane feed to the alkylation zone. Some of the fractional distillation load can be taken from the deisobutanizer and transferred to a molecular sieving operation (that is, the contacting of an isobutane-normal butane mixture with a mineral sorbent selective for straight chain hydrocarbons to the substantial exclusion of non-straight chain hydrocarbons) for producing a treated isobutane effluent stream virtually free of normal butane. A typical mineral sorbent effective for this use is a calcium sodium alumino-silicate Type A zeolite having about 80% of its exchangeable cation content as calcium. Periodically the sorbent becomes laden with straight chain hydrocarbons, and the sorbent is desorbed in conventional manner, e.g. with a hot inert fluid such as hydrogen gas, molten Woods metal, or the like.

My improved process has this significant advantage over conventional practice in a catalytic alkylation operation of the type described: it utilizes the available heat of the compressor discharge gases to assist in the deisobutanizing of crude alkylate for the recovery of unreacted butane, thus making interdependent these two utilities-hungry steps for improved economy in the overall process. Broadly, my process comprises: a catalytic alkylation process wherein isobutane in molar excess and an olefin-based alkylatable material are reacted in liquid phase in the presence of an alkylation catalyst in an alkylation zone under alkylation conditions, said alkylation zone is refrigerated by the evaporation of low boiling hydrocarbons including isobutane, and additional isobutane is recovered from the remaining liquid hydrocarbon phase containing alkylate product, the improvement which comprises: withdrawing the evaporated low boiling hydrocarbons including isobutane to a compression zone, therein compressing said evaporated low boiling hydrocarbons to a pressure sufficient for permitting their total condensing at a temperature between about 100 and about 250° F., fractionally distilling a stream of said remaining liquid hydrocarbon phase into an overhead distillate enriched in isobutane and a liquid bottoms fraction containing alkylate product, said liquid bottoms fraction being deisobutanized and enriched in normal butane by the fractional distillation, supplying at least a portion of the heat for the deisobutanizing fractional distillation of said remaining liquid hydrocarbon phase by indirect heat exchange between distilland resulting from said deisobutanizing fractional distillation and said compressed evaporated low boiling hydrocarbons, and recovering alkylate product from the bottoms product of said deisobutanizing fractional distillation.

The drawings are flow diagrams showing preferred ways in which my improvement can be applied to the alkylation process. In both figures, hereinafter described in detail, the reactor illustrated is a conventional type employing internal recirculation, e.g. a so-called Stratco contactor. It will be understood that the various equipment shown in the drawing is shown in the singular for simplicity but can stand for one or more of the same kind of items (towers, tanks, condensers, etc.) connected in series or parallel arrangement as necessary or desired. For clarity only the major equipment is represented in the drawings. Instruments, surge tanks, contactors, reflux returns, reboilers, and most valves are not shown, but are to be employed in conventional manner where necessary or desirable. It is to be understood also that, instead of a Stratco contactor for this service, the alkylation reactor can be of other conventional type such as the pump and time tank type wherein the average time of contact of the alkylation reaction mixture and catalyst is generally between about 5 and 45 minutes and, advantageously, 5 to 20 minutes.

Alternatively, the reaction vessel system can be of the autorefrigeration type, e.g. so-called Cascade reactor, wherein the reaction zone is refrigerated by evaporation of low boiling hydrocarbons including isobutane directly from the reaction zone at a fairly low pressure, the Cascade reactor ordinarily involving a single horizontal shell containing integrally a series of alkylation reaction zones and a hydrocarbon phase-catalyst phase settler.

In FIGURE 1 at least a portion of the crude alkylate is partially deisobutanized by fractional distillation in a preliminary distilling stage. The heat for such preliminary distilling stage is from the compressed low boiling hydrocarbon vapors generated by refrigerating the alkylation zone.

The process illustrated in FIGURE 1 is broadly suitable for use of an alkylatable olefin-based material containing some propane, e.g. propylene containing propane, propylene-butylene containing propane, or a so-called B-B stock or similar one of preponderantly butylene as the alkylatable material but containing propane. Such feeds will contain as a general rule at least about 1 mol percent propane, and they can contain as much as about 20 mol percent or even more. In the operation compressed hydrocarbon refrigerant vapors are totally condensed after indirect heat exchange with distilland from a preliminary deisobutanizing fractional distillation, the resulting condensate is fractionally distilled into an overhead distillate of propane and isobutane-rich liquid residue to rid the system of undesirable diluent propane, and the liquid isobutane-rich residue is used as reflux in said preliminary deisobutanizing fractional distillation. Because of the comparatively low temperature of the compressed hydrocarbon refrigerant vapors (which can be broadly between about 100° and about 250° F. and, advantageously, between about 110° and about 140° F.) the first stage of the debutanizing fractional distillation as shown in FIGURE 1 must be operated at a pressure not substantially above about 20 p.s.i.g. to achieve a practical heat transfer rate between the distilland and the compressed hydrocarbon refrigerant vapors in a reboiler of reasonable dimensions with a reasonable temperature approach between tube side and shell side fluids.

Referring more specifically to FIGURE 1, butylene containing 1 mol percent propane is admitted to inlet 10 and mixed with recovered recycled isobutane concentrate from line 12. This hydrocarbon mixture passes through heat exchanger 13 wherein it is cooled with alkylate by indirect heat exchange. The resulting cooled hydrocarbons are withdrawn in line 14, mixed with additional chilled isobutane-rich flashed depropanizer bottoms from line 16, and the resulting mixture passes through line 15 into alkylation contactor 17.

The contents of contactor 17 are maintained under about 35 p.s.i.g. which is sufficient to keep them in liquid phase. The effluent from contactor 17 passes through line 19 into separator 20. Herein it is separated into a liquid catalyst phase (92% $H_2SO_4$) and a liquid hydrocarbon effluent phase. Liquid catalyst is recycled to the contactor through line 18, spent catalyst being purged from the system through line 22 and fresh catalyst (98% $H_2SO_4$) being added to the system through line 23 to maintain catalyst strength at 92% and hydrocarbon:catalyst volume ratio about 1:1 in the contactor. The mol fraction of isobutane relative to all hydrocarbons in the reacted mixture is 0.75 and the temperature of the alkylation contactor contents is 40° F.

Separated hydrocarbon effluent phase is withdrawn from separator 20 through line 24 and passed through pressure reducing valve 25. Here the pressure is reduced from 35 p.s.i.g. to 2 p.s.i.g. with resultant flashing of principally propane and isobutane from the hydrocarbon phase, thus leaving a chilled remaining hydrocarbon liquid. This chilled remaining liquid and flashed vapors are fed into alkylation zone cooling coils 27 wherein additional hydrocarbons, principally isobutane, are vaporized, and the resulting mixture of vapor and liquid is passed through line 28 into vapor-liquid separator 29. The flashed and otherwise generated vapors (from heat exchange with the alkylation reaction mixture) are withdrawn through lines 37 and 39, knockout pot 40, and header 42 into the suction of compressor 43, together with other hydrocarbon vapors hereinafter described. Suction pressure of the compressor is about 0.5 p.s.i.g. If desired, some of the alkylate liquid separated in vapor-liquid separator 29 can be recirculated to the alkylation zone cooling coils through line 26.

The separated liquid phase hydrocarbons comprising unreacted isobutane and alkylate pass from vapor-liquid separator 29 through lines 30 and 32, pump 33, line 34, and indirect heat exchanger 13 for precooling feeds. This separated liquid phase emerges from heat exchanger 13, and a portion of it is sent through line 35 and pressure reducing valve 73 as feed to the first stage deisobutanizing fractional distillation conducted in bubble cap tray column 66. Pressure reducing valve 73 throttles the feed to tower pressure of 10 p.s.i.g. The balance of the crude alkylate from exchanger 13 is passed through line 36 and into mixer 84 for caustic washing as hereinafter described.

The first stage of the deisobutanizing fractional distillation (in tower 66) is operated with a heat supply from heat exchanger 45 which boils distilland flowing to the exchanger through line 74; it returns to the tower base from the exchanger through line 75. Isobutane-rich reflux enters the top of the tower through line 65 from a source hereinafter described. By virtue of this first stage distillation an overhead distillate vapor richer in isobutane (and lower boiling material) than the feed from line 35 is withdrawn from the tower, then passed through line 76 and pressure reducing valve 77 wherein pressure thereon is reduced to compressor suction pressure of about 0.5 p.s.i.g. These vapors mix with those from line 37 and pass through line 39, knockout pot 40, and line 42 into compressor 43.

The liquid bottoms product from tower 66, having been partially deisobutanized and thus enriched in normal butane by the first stage fractional distillation, passes through line 78, pump 79, cooler 80, and valve 82 into line 83 and caustic mixer 84, along with alkylate from line 36.

The vapors in compressor 43 are compressed to a pressure of 200 p.s.i.g. and discharged from the compressor through line 44 and into heat exchanger 45 at a temperature of 135° F. A small amount of the vapors can be made to by-pass the heat exchanger through line 46 for regulatory purposes. Some condensation of the compressed refrigerant vapors occurs in exchanger 45, and the resulting vapor-liquid mixture is conducted through line 47 into condenser-cooler 48 wherein the vapors are totally condensed and the total condensate cooled.

The cooled condensate passes through pump 49 into tank 50, out line 52, through feed-bottoms exchanger 53, into depropanizer inlet 54, thence into depropanizing tower 55. Herein the condensate is fractionally distilled in conventional manner to separate sharply an overhead distillate of propane, which is removed from the system through pump 56 and line 57, and an isobutane-rich liquid bottoms fraction which is removed from tower 55 through line 58. The bottoms fraction is cooled in exchanger 53 and passes through line 59 into cooler 60 wherein it is further cooled by indirect heat exchange with water. A portion of the cooled liquid bottoms fraction is passed through pump 62, line 63, throttle valve 64, and line 65 for refluxing the first stage deisobutanizing fractional distillation in tower 66. The balance of the cooled depropanizer bottoms passes through line 67 and pressure reducing valve 68. Herein pressure is reduced to compressor suction pressure with the resulting flashing of principally isobutane from the hydrocarbon phase to leave a chilled remaining hydrocarbon liquid rich in isobutane. This vapor-liquid mixture discharges into separator 69. The separated vapors are withdrawn through line 38 and passed with hydrocarbon vapors from vessel 29 through lines 37 and 39, knockout pot 40, and line 42 into the suction of compressor 43.

The chilled remaining liquid, predominantly isobutane, is withdrawn from separator 69 through line 70 and pump 72, and it is passed through lines 16 and 15 to supplement the isobutane feed to alkylation contactor 17. At this point it should be understood that some or all of the reflux to tower 66 can be provided by this chilled isobutane stream in place of some or all of that entering tower 66 from line 65.

The hydrocarbon streams entering mixer 84 are washed with aqueous caustic soda solution from line 85. The resulting mixture is passed into caustic settler 86 wherefrom aqueous caustic soda solution is withdrawn for recirculation, purged, and made up with fresh caustic soda by means not shown to maintain sodium hydroxide strength and solution volume.

The caustic washed hydrocarbon phase then passes through line 87 into mixer 88. There it is scrubbed with water entering from line 89. The resulting mixture is discharged into water settler 90 wherefrom separated water is recycled, purged, and replenished by means not shown. The water washed hydrocarbon mixture is then discharged through line 92, pump 93, deisobutanizer feed heater 95, inlet 96, then passed into the second stage deisobutanizing tower 97. Make-up isobutane with some normal butane therein is also fed to heater 95 through line 94.

Second stage deisobutanizing tower 97 by conventional fractional distillation produces an overhead product of isobutane concentrate which contains 95 mol percent isobutane, and a bottoms fraction of normal butane and higher boilers. The overhead product is withdrawn through line 12 and pump 99 for return to contactor 17 as hereinbefore described.

The bottoms fraction from tower 97 passes through line 100 and pump 102 into product debutanizer 103. Tower 103 is operated in conventional manner to produce a sharply-cut distillate of normal butane, which is withdrawn from the system through line 104 and pump 105, and a liquid bottoms fraction containing the total alkylate, which is withdrawn through line 106, pump 107, heater 108, and passed into rerun tower 109.

In rerun tower 109, a fractional distillation tower operated in conventional manner, the alkylate is separated into an overhead distillate of aviation alkylate having an end boiling point of 338° F., this being withdrawn through line 110 and pump 112, and alkylate bottoms, this being withdrawn through line 113 and pump 114 for use as cracking stock. However, it should be realized that, for automotive fuel, rerun tower 109 can be dispensed with in the general instance because the bottoms from tower 103 are suitable for this purpose.

The process illustrated in FIGURE 2 will be recognized as involving the heat pump principle wherein the refrigerant vapors are compressed to a pressure above that of the deisobutanizing fractional distillation (which is conducted in a single stage in this embodiment). The resulting compressed hydrocarbon vapors are heat-exchanged with distilland from the deisobutanizing fractional distillation taken by trap tray or similar device at a location whereby the heat from these vapors can be effectively exchanged with the distilland for assisting to reboil said distilland. In the embodiment shown in FIGURE 2 pressure on the deisobutanizing fractional distillation (top of tower) can be considerably higher than the embodiment shown in FIGURE 1, e.g. upwards to about 60 p.s.i.g., because the tower bottoms containing the comparatively high boiling alkylate are reboiled by heat from an external source, e.g. exhaust steam, and only intermediate boiling distilland is heated by the compressed refrigerant vapors.

Referring to FIGURE 2, a mixture of propylene and butylene is fed to contactor 127 through inlet 125. Alternatively, if desired, this feed can be replaced wholly or in part by a solution of the corresponding alkyl sulfates in sulfuric acid, that is "rich" acid. The reactor conditions in contactor 127 are the same as those described in connection with the embodiment illustrated in FIGURE 1, except that the pressure is 60 p.s.i.g. to keep liquid phase conditions. The effluent from contactor 127 is withdrawn through line 128 and passed into acid settler 129. Herein it is separated into a liquid catalyst phase of 90% sulfuric acid and a liquid hydrocarbon effluent phase. Liquid catalyst is recycled to the contactor through line 130 with spent catalyst being purged through line 132 and fresh 99.5% sulfuric acid being added through line 133 to maintain catalyst strength at 90% and hydrocarbon:catalyst volume ratio at 1:1 in the contactor.

The separated hydrocarbon effluent phase passes through line 134 and pressure reducing valve 135 whereby pressure is reduced on these hydrocarbons to 1 p.s.i.g. The resulting chilled flashed hydrocarbon vapor-liquid mixture passes through reactor cooling coils 136 and is discharged through line 137 into vapor-liquid separator 138, along with volatilized materials generated in the alkylation zone cooling coils. The separated remaining liquid phase hydrocarbons are withdrawn through line 139, passed through heat exchanger 140, and sent through line 142 as feed to the debutanizing fractional distillation in tower 158. Vapors separated in vessel 138 pass through line 143 and into suction line 145 of compressor 146, together with additional hydrocarbon vapors, preponderantly isobutane, entering from line 165.

The compressed low boiling hydrocarbons discharge from compressor 146, through line 147, heat exchanger 148 (wherein they are partially condensed), line 149, and into total condenser-cooler 150. The resulting cooled condensate passes through line 152 and is flashed by pressure reduction to 1 p.s.i.g. through pressure reducing valve 153. From this there results formation of chilled liquid and vapor phases which discharge into separator 154. The chilled vapor phase passes through line 164 and into line 165 for delivery to the compressor suction. Being cool it assists in efficient compressor operation.

The hydrocarbon liquid from separator 154 passes through line 155. A portion of it is pumped through line 159, pump 160, and lines 162 and 163 for eventual delivery to the contactor to assist in maintaining the high isobutane concentration therein. The balance of the separated liquid from line 155 is pumped through pump 156 and line 157 for reflux to the deisobutanizing fractional distillation conducted in bubble cap tray tower 158.

In tower 158 line 168 leads from a conventional trap tray to deliver distilland through heat exchanger 148. Heated distilland emerges from line 169 for return to tower 158 to vaporize liquid therein. The tower is operated at an overhead pressure of 30 p.s.i.g. controlled by back pressure control valve 166 is overhead distillate drawoff line 167. Supplemental heat, furnished by exhaust steam, is supplied to the base of the column in reboiler 170. Overhead distillate, having a concentration of 95 mol precent isobutane, passes through line 167 and valve 166, then through line 165 into the suction of compressor 146. This distillate is in vapor form.

The liquid bottoms fraction from deisobutanizer 158 is withdrawn through line 172 and pump 173 for caustic washing in mixer 174 with aqueous caustic soda solution entering from line 175. The liquid bottoms fraction from tower 158 contains the hydrocarbons having a boiling point above that of isobutane.

After caustic treating the hydrocarbon-caustic mixture discharges into caustic settler 176 wherein the aqueous caustic phase is separated for recirculation through line 175, purged, and made up by means not shown. The caustic washed hydrocarbon passes out line 177 into mixer 178 for washing with water entering from line 179. Water is purged and made up by means not shown.

The hydrocarbon-water mixture discharges into settler 180, and separated hydrocarbon phase is withdrawn through line 182, then passed into salt saturator 184 along with an isobutane make-up supply containing some propane, which supply enters through line 183.

The salt saturator serves to dry the feed; aqueous salt solution is withdrawn through line 185. The dried hydrocarbons pass through line 186 and pump 187 into product debutanizer 188.

Herein, by fractional distillation in conventional manner, the hydrocarbons are separated into a liquid bottoms fraction of alkylate for automative fuel, which is withdrawn through line 189 and pump 190, and an overhead distillate fraction of $C_4$ and lower hydrocarbons, which is withdrawn through line 191 and pump 192.

The distillate fraction from tower 188 is fractionally redistilled in conventional manner in tower 193 to separate sharply propane, which is withdrawn as an overhead product through line 194 and pump 195, and a liquid bottoms fraction of predominantly isobutane. It should be understood, however, that such redistillation can be dispensed with if the feed to the process is propane-free or virtually so.

The liquid bottoms fraction from tower 193 passes through line 196, pump 197, line 163, and heat exchanger 140 for cooling. Then it is fed into alkylation contactor 127 as hereinbefore described.

I claim:

1. In a catalytic alkylation process wherein isobutane in molar excess and an olefin-based alkylatable material containing propane are reacted in liquid phase in the presence of an alkylation catalyst in an alkylation zone under alkylation conditions, said alkylation zone is refrigerated by the evaporation of low boiling hydrocarbon including isobutane and propane, and additional isobutane is recovered from the remaining liquid hydrocarbon phase containing alkylate product, the improvement which comprises: withdrawing the evaporated low boiling hydrocarbons including isobutane and propane to a compression zone, therein compressing said evaporated low boiling hydrocarbons to a pressure sufficient for permitting their total condensing at a temperature between about 100 and about 250° F., fractionally distilling a stream of said remaining liquid hydrocarbon phase into an overhead distillate enriched in isobutane and a liquid bottoms fraction containing alkylate product in a first fractional distillation zone, said liquid bottoms fraction being deisobutanized and enriched in normal butane by the fractional distillation, supplying at least a portion of the heat for the deisobutanizing fractional distillation of said remaining liquid hydrocarbon phase by indirect heat exchange between distilland resulting from said deisobutanizing fractional distillation and said compressed evaporated low boiling hydrocarbons, totally condensing said compressed hydrocarbon vapors after said indirect heat exchange with said distilland forming a condensate, fractionally distilling said condensate into an overhead distillate of propane and an isobutane-rich liquid residue in a second fractional distillation zone, cooling said liquid isobutane-rich residue, passing at least a part of said cooled liquid isobutane-rich residue as reflux to said first fractional distillation zone, and recovering alkylate product from the bottoms product of said deisobutanizing fractional distillation.

2. The process of claim 1 wherein the pressure on the first stage of said deisobutanizing fractional distillation is between about 0 and about 20 p.s.i.g.

3. The process of claim 1 wherein the alkylation catalyst is sulfuric acid, and the alkylatable material is at least one olefinic hydrocarbon.

4. In a catalytic alkylation process wherein isobutane in molar excess and an olefin-based alkylatable material are reacted in liquid phase in the presence of an alkylation catalyst in an alkylation zone under alkylation conditions, said alkylation zone is refrigerated by the evaporation of low boiling hydrocarbons including isobutane, and additional isobutane is recovered from the remaining liquid hydrocarbon phase containing alkylate product, the improvement which compromises: fractionally distilling a stream of said remaining liquid hydrocarbon phase into an overhead distillate in vapor form enriched in isobutane and a liquid bottoms fraction containing alkylate product, passing said overhead distillate in vapor form in admixture with said evaporated low boiling hydrocarbons and flashed vapor phase from a later step to a compression zone, compressing the resulting mixture of hydrocarbon vapors to a pressure above said deisobutanizing fractional distillation and sufficient for permitting their total condensing at a temperature between about 100 and about 250° F., passing said compressed mixture of hydrocarbon vapors in indirect heat exchange with distilland resulting from said deisobutanizing fractional distillation whereby at least a portion of said compressed mixture of hydrocarbon vapors is condensed, flashing the resultant compression condensate as said later step in a zone of lower pressure whereby said resulting compression condensate is converted into a flashed vapor phase and a chilled remaining liquid phase, passing at least a part of said chilled remaining liquid phase as reflux to said deisobutanizing fractional distillation, and recovering alkylate product from the bottoms product of said deisobutanizing fractional distillation.

5. The process of claim 4 wherein the pressure on the deisobutanizing fractional distillation is between about 0 and about 60 p.s.i.g.

6. The process of claim 4 wherein the alkylation catalyst is sulfuric acid, and the alkylatable material is at least one olefinic hydrocarbon.

7. In a catalytic alkylation process wherein isobutane in molar excess and an olefin-based alkylatable material are reacted in liquid phase in the presence of an alkylation catalyst in an alkylation zone under alkylation conditions, said alkylation zone is refrigerated by the evaporation of low boiling hydrocarbons including isobutane, and additional isobutane is recovered from the remaining liquid hydrocarbon phase containing alkylate product, the improvement which comprises: withdrawing the evaporated hydrocarbons including isobutane to a compression zone, compressing said evaporated hydrocarbons to an elevated pressure whereby said evaporated hydrocarbons are heated to a temperature above 100° F., said elevated pressure being at least sufficient to effect total condensation of said evaporated hydrocarbons upon cooling in a subsequent process step, fractionating at least a part of said remaining liquid hydrocarbon phase in a deisobutanizing fractional distillation zone into recovered isobutane distillate and alkylate-containing bottoms, passing said compressed hydrocarbons in indirect heat exchange with distilland of said deisobutanizing fractional distillation zone thereby supplying at least a part of the heat for said fractionation and cooling said compressed evaporated hydrocarbons, totally condensing said compressed evaporated hydrocarbons forming an isobutane-rich condensate, and recycling at least a part of said isobutane-rich condensate to said alkylation zone.

8. In a catalytic alkylation process wherein isobutane in molar excess and an olefin-based alkylatable material are reacted in liquid phase in the presence of an alkylation catalyst in an alkylation zone under alkylation conditions, said alkylation zone is refrigerated by the evaporation of low boiling hydrocarbons including isobutane, and additional isobutane is recovered from the remaining liquid hydrocarbon phase containing alkylate product, the improvement which comprises: withdrawing the evaporated hydrocarbons including isobutane to a compression zone, compressing said evaporated hydrocarbons to an elevated pressure whereby said evaporated hydrocarbons are heated to a temperature above 100° F., said elevated pressure being at least sufficient to effect total condensation of said evaporated hydrocarbons upon cooling in a subsequent process step, fractionating at least a part of said remaining liquid hydrocarbon phase in a deisobutanizing fractional distillation zone into recovered isobutane distillate and alkylate-containing bottoms, passing said compressed hydrocarbons in indirect heat exchange with distilland of said deisobutanizing fractional distillation zone thereby supplying at least a part of the heat for said fractionation and cooling said compressed evaporated hydrocarbons, totally condensing said compressed evaporated hydrocarbon forming an isobutane-rich condensate, passing a part of said isobutane-rich condensate as reflux to said deisobutanizing fractional distillation zone, and recycling a part of said isobutane-rich condensate to said alkylation zone.

9. In a catalytic alkylation process wherein isobutane in molar excess and an olefin-based alkylatable material are reacted in liquid phase in the presence of an alkylation catalyst in an alkylation zone under alkylation conditions, said alkylation zone is refrigerated by the evaporation of low boiling hydrocarbons including isobutane, and additional isobutane is recovered from the remaining liquid hydrocarbon phase containing alkylate product, the improvement which comprises: withdrawing the evaporated hydrocarbons including isobutane to a compression zone, compressing said evaporated hydrocarbons to an elevated pressure whereby said evaporated hydrocarbons are heated to a temperature above 100° F., said elevated pressure being at least sufficient to effect total condensation of said evaporated hydrocarbons upon cooling in a subsequent process step, fractionating at least a part of said remaining liquid hydrocarbon phase in a deisobutanizing fractional distillation zone into recovered isobutane distillate and alkylate-containing bottoms, passing said compressed hydrocarbons in indirect heat exchange with distilland of said deisobutanizing fractional distillation zone thereby supplying at least a part of the heat for said fractionation and cooling said compressed evaporated hydrocarbons, totally condensing said compressed evaporated hydrocarbons forming an isobutane-rich condensate, fractionating said isobutane-rich condensate in a depropanizing fractional distillation zone into propane distillate and a depropanized condensate bottoms fraction, and passing at least a part of said depropanized condensate as reflux to said deisobutanizing fractional distillation zone.

10. In a catalytic alkylation process wherein isobutane in molar excess and an olefin-based alkylatable material are reacted in liquid phase in the presence of an alkylation catalyst in an alkylation zone under alkylation conditions, said alkylation zone is refrigerated by the evaporation of low boiling hydrocarbons including isobutane, and additional isobutane is recovered from the remaining liquid hydrocarbon phase containing alkylate product, the improvement which comprises: fractionating at least a part of said remaining liquid hydrocarbon phase in a deisobutanizing fractional distillation zone into vaporiform isobutane distillate and alkylate containing bottoms, combining said vaporiform isobutane distillate, said evaporated low boiling hydrocarbons, and flashed vapor from a later step forming a mixed hydrocarbon vapor, compressing said mixed hydrocarbon vapor to an elevated pressure whereby said mixed hydrocarbon vapor is heated to a temperature above 100° F., passing said compressed mixed hydrocarbon vapor in indirect heat exchange with distilland of said deisobutanizing fractional distillation zone thereby supplying at least a portion of the heat for said fractionation and cooling said compressed mixed hydrocarbon vapor, totally condensing said mixed hydrocarbon vapor forming an isobutane-rich condensate, flashing said isobutane-rich condensate as said later step forming flashed vapor and chilled remaining liquid isobutane, and passing at least a portion of said chilled remaining liquid isobutane as reflux to said deisobutanizing fractional distillation zone.

11. In an alkylation process which comprises reacting an olefin with isobutane to produce a liquid hydrocarbon effluent containing alkylate product and a vaporous hydrocarbon effluent, the improvement which comprises: passing said liquid effluent to a distillation zone wherein low boiling materials are removed as a vaporous fraction from the liquid alkylate product, compressing said vaporous fraction and said vaporous effluent, passing the compressed vapors to said distillation zone in indirect heat exchange therewith to reboil said distillation zone, and removing liquid alkylate product from said distillation zone.

12. In an alkylation process which comprises contacting an olefin with isobutane in the presence of sulfuric acid as a catalyst in an alkylation contactor to produce a vaporous hydrocarbon effluent containing isobutane and a liquid effluent containing catalyst, alkylate and unreacted isobutane; separating the vaporous effluent from the liquid effluent; separately removing the catalyst from the liquid effluent; and subjecting the remaining liquid alkylate mixture to deisobutanization, the improvement which comprises: passing the liquid alkylate mixture to a deisobutanization zone, withdrawing unreacted isobutane as a vaporous fraction from said zone, mixing the vaporous fraction with the vaporous effluent and compressing the vaporous mixture, supplying heat necessary to effect the aforementioned deisobutanization by passing, as a heat exchange medium, in indirect heat exchange with said deisobutanization zone, at least a portion of the vapors which have been compressed to a pressure at which the temperature is above the boiling point of the isobutane reactant, below the boiling point of the higher boiling components of the alkylate mixture and at least at which the vapor is at least partially condensed during the heat exchange operation, recycling at least a portion of the resulting condensate to the alkylation zone as part of the feed thereto at substantially the same pressure as that employed in the alkylation contactor, removing as bottoms from said deisobutanization zone a deisobutanized liquid alkylate mixture containing sulfur-bearing contaminants, subjecting said contaminated alkylate mixture to treatment for the removal of sulfur-bearing materials, subjecting the treated liquid alkylate mixture to debutanization and fractioning the debutanized alkylate into light and heavy fractions as products of the process.

13. In an alkylation process which comprises contacting an olefin with isobutane in the presence of sulfuric acid as a catalyst in an alkylation contactor to produce a vaporous hydrocarbon effluent containing isobutane and a liquid effluent containing catalyst, alkylate and unreacted isobutane; separating the vaporous effluent from the liquid effluent; separately removing the catalyst from the liquid effluent; and subjecting the remaining liquid alkylate mixture to deisobutanization, the improvement which comprises: passing at least a portion of the liquid alkylate mixture to a deisobutanization zone; withdrawing unreacted isobutane as a vaporous fraction from said zone; compressing the vaporous fraction and vaporous effluent; supplying heat necessary to effect the aforementioned deisobutanization of said liquid alkylate mixture in said zone by passing as a heat exchange medium, in indirect heat exchange with said deisobutanization zone, said vapors which have been compressed to a pressure at which the temperature is above the boiling point of the isobutane reactant, below the boiling point of the higher boiling components of the alkylate mixture and at least that at which condensation of the vapors occurs during the heat exchange operation; flashing said condensed heat exchange medium to produce a vaporous portion and a liquid portion; returning said vaporous portion to said compressor; recycling the liquid portion to the alkylation contactor as a part of the isobutane feed thereto at substantially the same pressure as that employed in the alkylation contactor and recovering a deisobutanized liquid alkylate mixture from said isobutanization zone.

References Cited in the file of this patent
UNITED STATES PATENTS

| | | |
|---|---|---|
| 2,320,199 | Sellmeyer | May 25, 1943 |
| 2,429,205 | Jenny et al. | Oct. 21, 1947 |
| 2,666,019 | Winn et al. | Jan. 12, 1954 |
| 2,829,181 | Stiles et al. | Apr. 1, 1958 |